3,487,035
POLYETHYLENE EMULSIONS FOR COATING GLASSWARE
Burton S. Bogart, Forest Hills, N.Y., assignor to Anchor Hocking Glass Corporation, Lancaster, Ohio, a corporation of Delaware
No Drawing. Filed Mar. 11, 1965, Ser. No. 439,073
Int. Cl. C09d 3/60
U.S. Cl. 260—23      5 Claims

ABSTRACT OF THE DISCLOSURE

A coating composition that may be applied over either pristine or coated glass to give increased lubrication and protection against contact damage. The coating emulsion comprises water, polyethylene, and an emulsifier comprising potassium palmitate and either the alkali metal salt of an alkylaryl sulfonic acid or of a sulfonated dicarboxylic acid alkyl ester.

---

This invention relates to a novel coating composition for application to the surfaces of glass articles, such as glass containers, as a lubricant and to protect the surfaces from contact damage. More particularly, the invention concerns a polyethylene emulsion for application to glass surfaces, the method of its preparation and use, and glass surfaces coated therewith.

The adverse effects of glass-to-glass contacts upon the strength of glass articles such as containers and flat glass are well known, and considerable attention has been devoted to the development of protective coatings which will provide lubrication and at the same time minimize damage caused by scratching. One method of increasing scratch resistance of a glass surface is to expose it to the vapor of metallo-organic compounds of titanium, zirconium or aluminum at elevated temperatures, whereby the vapors are pyrolyzed to form a metal oxide coating on the glass surface, as disclosed in U.S. Patent 2,831,780. While coatings of this type are useful for the purpose indicated, they do not impart lubrication. Accordingly, compositions have been proposed for increasing lubricity of glass surfaces, and these have been based largely upon the use of polymeric substances, some of which have been adapted to be applied directly, and others in the form of aqueous emulsions. While the coating materials available for direct application possess certain advantages, few have met the approval of the Food and Drug Law for coating glassware containers intended for food or cosmetic use. Silicones and polyethylenes are customarily applied to glass surfaces in the form of aqueous emulsions, but those polyethylene emulsions thus far available have not been wholly satisfactory in regard to receptivity toward the commonly used label adhesives.

In accordance with the present invention, there is provided a novel polyethylene emulsion type coating composition for application to the surfaces of glass articles which exhibits improved performance characteristics and which possesses several advantages over previously known polyethylene emulsion types of coatings.

The polyethylene emulsion coating of the invention includes as its active ingredients: polyethylene, an emulsifier comprising the alkali metal salt of an alkylarylsulfonic acid and potassium palmitate. There may also be included a small amount of an alkali metal salt of a sulfonated dicarboxylic acid alkyl ester as an auxiliary emulsifier to obtain improved dispersion, or in substitution for the alkylaryl sulfonic acid salt.

While any type of emulsifiable polyethylene may be employed, it has been found preferable to utilize for the purpose of the invention a low molecular weight (1200 to 2000) partially oxidized type sold commercially under the designation AC–629.

As an alkali metal salt of an alkylarylsulfonic acid it is preferred to use sodium dodecylbenzene sulfonate, one type of which is sold commercially under the designation AA–10.

The potassium palmitate is advantageously employed in the form of a 40% grade (potassium palmate) manufactured by saponification of palmitic acid $C_{15}H_{31}COOH$, with caustic potash.

The alkali metal salt of a sulfonated dicarboxylic acid ester is preferably sodium dioctylsulfosuccinate, sold commercially under the designation Aerosol–OT.

In accordance with the preferred practice of the invention, glycerine is incorporated into the coating composition, it having been found that glycerine serves to hold the polyethylene in solution at temperatures below the boiling point of water.

As prepared in accordance with the novel method disclosed below, the polyethylene emulsion coating composition of the invention possesses numerous advantages. One of these is that both the polyethylene and the potassium palmitate are approved for food contact under the Food and Drug Law. Moreover the potassium palmitate possesses valuable coating characteristics of its own.

The coating composition of the invention, when applied to glass surfaces, and particularly glass container surfaces, provides a permanent type of coating, which is clear and water-white, and which is receptive to most types of label adhesives. It reduces the tendency of container abrasion by glass-to-glass contact during processing. It is readily applied by spraying or brushing to glassware emerging from the low temperature end of an annealing lehr. The reduction in abrasion results in retention of a high proportion of the original container strength.

Another advantage is the imparting of increased lubricity to the surface of glass containers, which is particularly valuable in the case of screw-cap type jars. In the filling and sealing of such jars, additional torque can be used in applying the screw cap, while at the same time the subsequent removal of the cap is, despite the additional torque, facilitated by the presence of the lubricant film.

An unexpected advantage of the coating compositions of the invention lies in their ability to be applied upon an undercoat or substrate of a previously deposited scratch resistant layer, such as the oxide of titanium, zirconium or aluminum, described previously. The polyethylene emulsion coating provides necessary lubricity, while at the same time the water resistance of the combination is enhanced. In addition, it has been found that the undercoat brings about an improved adhesion and retention of the polyethylene film, particularly when subjected to subsequent food processing, including autoclaving and like operations.

The lubricated containers of the invention move more smoothly through machines such as filling and sealing machines, and with greatly reduced tendencies toward jamming in the conveyor systems.

The proportions of the various ingredients of the coating compositions of the invention are critical and should be kept within comparatively narrow limits in order to obtain the desired performance, and in order to obtain the optimum stability when the emulsion is prepared in accordance with the novel method of the invention described further on.

The permissible ranges of composition, expressed both in parts by weight, and in percentage composition, for the various ingredients of the emulsion, are as follows:

TABLE

| Ingredient | Parts by weight | Wt. percent composition |
| --- | --- | --- |
| Polyethylene (AC-629) | 8-12 | 13-19.5 |
| Emulsifier | 0.4-2 | 0.6-1.6 |
| Potassium palmitate (40%) | 1.5-3 | 2.5-5.0 |
| Water (distilled) | 45-50 | 70-80 |

If the proportion of polyethylene is reduced below the limits indicated, the effect is to increase the relative amounts of the emulsifier in the formulation, thereby causing excessive solubility of the final coating, and as a result, loss of coating in the processing of the container in hot water or in steam autoclaving. This would defeat one of the purposes of the coating in that it is substantially a permanent type of coating. Excess polyethylene results in a waxy, uneven film.

Glycerine in a proportion of about 15% to 20% by weight may be included in the above formulation, with a corresponding percentage decrease of the other ingredients.

A preferred coating formulation, in accordance with the invention, has the proportions:

TABLE 2

| Ingredient | Parts by weight | Wt. percent composition |
| --- | --- | --- |
| Polyethylene (AC-629) | 10.0 | 16.3 |
| Sodium dodecylbenzene sulfonate (AA-10) | 0.5 | 0.8 |
| Potassium palmitate (40%) | 3 | 4.9 |
| Water (distilled) | 48.0 | 78.0 |

Another preferred formulation, in which sodium dioctylsulfosuccinate (Aerosol-OT) is used as the emulsifier, is as follows:

TABLE 3

| Ingredient | Parts by weight | Wt. percent composition |
| --- | --- | --- |
| Polyethylene (AC-629) | 10.0 | 16.3 |
| Aerosol-OT (100%) | 1.5 | 2.4 |
| Potassium palmitate (40%) | 2.0 | 3.25 |
| Water (distilled) | 48.0 | 78.0 |

In accordance with another preferred aspect of the invention, glycerine is included in both the foregoing specific formulations, as shown in Tables 4 and 5:

TABLE 4

| Ingredient | Parts by weight | Wt. percent composition |
| --- | --- | --- |
| Polyethylene (AC-629) | 10.0 | 12.3 |
| Glycerine | 20.0 | 24.5 |
| Sodium dodecylbenzene sulfonate (AA-10) | 0.5 | 0.6 |
| Potassium palmitate (40%) | 3.0 | 3.7 |
| Water (distilled) | 48.0 | 59.8 |

TABLE 5

| Ingredient | Parts by weight | Wt. percent composition |
| --- | --- | --- |
| Polyethylene (AC-629) | 10.0 | 13.1 |
| Glycerine | 15.0 | 19.6 |
| Aerosol-OT (100%) | 1.5 | 2.0 |
| Potassium palmitate (40%) | 2.0 | 2.6 |
| Water (distilled) | 48.0 | 62.7 |

In the preparation of the novel polyethylene coating emulsions of the invention, which exhibit the lubricity and the acceptance of label adhesives which are so desirable, it is necessary to observe a rather specific formulation procedure to obtain optimum results. The method of formulation of the invention achieves the additional objectives of (a) highest possible percentage solids content, (b) maximum ratio of polyethylene to emulsifier, and (c) lowest possible ratio of residue to solids present.

The general method of preparation of the polyethylene emulsion comprises the following steps:

(1) Melting the polyethylene and holding the molten material at a temperature between about 110° and 125° C., preferably at about 120° C. (248° F.); where glycerine is used, it is admixed with the polyethylene in this step;

(2) Adding the emulsifier, preferably in molten form, to the melted polyethylene;

(3) Preheating water to a temperature between about 95° and 100° C., preferably about 99° C.;

(4) Adding the molten mixture of polyethylene and emulsifier at a temperature between about 95° and 100° C. to the preheated water, with agitation, to form an emulsion containing about 16% to 20% solids, preferably about 18.5% solids;

(5) Alternatively, the preheated water may be added to the polyethylene-emulsifier mixture while strongly agitating the latter, preferably sufficiently to form a vortex, and directing the stream of water into the vortex.

The ingredients added during the second step include the potassium palmitate, and at least one of the emulsifiers sodium dodecylbenzene sulfonate and sodium dioctylsulfosuccinate.

While it is known to employ polyethylene emulsions for treating glass surfaces, as shown, for example, in U.S. Patent 2,995,533, the emulsions of the present invention are prepared by a wholly different and novel method, and employ much smaller amounts of polyethylene.

The preparation of the emulsion of the invention is illustrated by the following examples, which are not, however, to be regarded as limiting:

EXAMPLE 1

10.0 parts by weight of polyethylene (AC-629) and 20.0 parts by weight of glycerine are mixed in a stainless steel vessel and the mixture is heated until all the polyethylene has melted and a clear, uniform solution is obtained. To the above mixture, heated to a temperature of about 120° C., there was added 0.5 part by weight of sodium dodecylbenzene sulfonate (AA-10) and 3.0 parts by weight of potassium palmitate (40%) and the entire mixture was stirred until it had a clear uniform appearance. 48 parts of distilled water were heated in a separate container equipped with a valve controlled spout at the base to a temperature of about 95-99° C., while at the same time the temperature of the polyethylene melt mixture was reduced to 95-99° C.

48 parts by weight of the heated water were run in a steady stream into the polyethylene mixture which was kept strongly agitated by a mechanical mixer, the stream of water being directed into the vortex created by the mixture at a rate such that the flow of water was not too rapid nor too sluggish. The agitation was continued until the emulsion had cooled to room temperature. The time of agitation was kept within ten minutes to avoid inclusion of too much air into the emulsion.

EXAMPLE 2

Proceeding as in Example 1, 10 parts by weight of polyethylene were melted in a stainless vessel at about 120° C. until a clear melt was obtained. There were added to the melt 1.5 parts by weight of Aerosol–OT and 2.0 parts by weight of potassium palmitate (40%). With the heat still applied, the entire mixture was stirred until it had a clear and uniform appearance. The mixture after cooling to 95–99° C. was then poured with agitation into 48 parts of distilled water maintained at 95–99° C. and agitation continued until the emulsion thus formed had cooled to room temperature.

EXAMPLE 3

Proceeding as in Example 1, an emulsion was prepared from 10.0 parts of polyethylene, 15.0 parts glycerine, 1.5 parts Aerosol–OT, 2.0 parts potassium palmitate and 48.0 parts distilled water, all by weight.

EXAMPLE 4

Proceeding as in Example 2, an emulsion was prepared from 10.0 parts of polyethylene, 0.5 part of emulsifier AA–10, 3.0 parts potassium palmitate (40%) and 48 parts distilled water.

The foregoing emulsions of the invention are prepared for application to the glassware by dilution in water in a ratio of between about 150 and about 200 parts of water to 1 part of emulsion. The diluted solution is applied to glassware preferably at a temperature in the vicinity of 200° F., or about the temperature corresponding to the emergent end of an annealing lehr, in finely divided form, preferably by spraying over the glassware.

When subjected to standard physical tests, the polyethylene emulsion of Example 1 showed the following test characeristics:

TABLE 6

| | Polyethylene Emulsion |
|---|---|
| (1) Appearance | Slightly cloudy. |
| (2) Film strength | Very good. |
| (3) Average dry lubricity | [1].184. |
| (4) Average wet lubricity | [1].438. |
| (5) Hot water test | 150° F. for 45 min. |
| (A) Average lub. before test | [1].173. |
| (B) Average lub. after test | [1].229. |
| (C) Difference in lub. | [1].056. |
| (6) Film strength after hot water test | Fair. |

[1] These figures are coefficient of friction measurements and the lower this figure, the better the lubricity. Jars not coated with a lubricity coating have a coefficient of friction in the area of .7 to .8.

As indicated previously, the coating compositons of the invention are capable of being applied upon an undercoat or substrate of a previously deposited scratch resistant layer, such as a thin film of titanium dioxide. In such case the glass containers are treated directly after formation and at elevated temperature with the vapors of an alkyl titanate ester, such as, for example, tetraisopropyl titanate. The following example illustrates this aspect of the invention:

EXAMPLE 5

Glass jars immediately after forming and at a temperature of about 900° F. were treated with vapor of tetraisopropyl titanate which had been vaporized at a temperature of about 200° F. A stream of the vapor was directed against the surface of the glass by means of a spray nozzle. Contact with the hot glass for about 20 minutes pyrolyzed the titanate to form a thin film of titanium dioxide on the surface of the glass. Thereafter the thus treated glass surface was further treated while still at a temperature of about 200° F. with a spray of the emulsion of Example 1 which had been previously diluted with water in a ratio of 150 to 1.

What is claimed is:

1. A coating composition for application to glass surfaces for lubrication and protection against contact damage said composition comprising from about 150 to about 200 parts of water and about one part by weight of an aqueous emulsion, said emulsion comprising from about 8 to about 12 parts by weight of a polyethylene having a molecular weight from about 1,200 to about 2,000, from about 0.4 to about 2.0 parts by weight of at least one emulsifier selected from the group consisting of an alkali metal salt of an alkylbenzene sulfonic acid and an alkali metal salt of a sulfonated succinic acid alkyl ester, from about 1.5 to about 3.0 parts by weight of potassium palmitate, from about 45 to about 50 parts by weight of water, and from about 15 to about 20 parts by weight of glycerine.

2. Method for the preparation of polyethylene coating composition for application to glass surfaces for lubrication and protection against contact damage, comprising the steps of:
   (a) melting a mixture of from about 8 to about 12 parts by weight of a polyethylene having a molecular weight from about 1,200 to about 2,000 and about 15 to about 20 parts by weight of glycerine, and maintaining the melt at a temperature between 110° C. to about 125° C.;
   (b) adding to the melt about 1.5 to about 3.0 parts by weight of potassium palmitate and from about 0.4 to about 2.0 parts by weight of at least one emulsifier selected from the group consisting of an alkali metal salt of an alkyl benzene sulfonic acid and an alkali metal salt of a sulfonated succinic acid alkyl ester;
   (c) adding the molten mixture with agitation to from about 45 to about 50 parts of water preheated to a temperature between about 95° C. and about 100° C. to form an emulsion containing from about 16% to about 20% by weight of polyethylene solids;
   (d) and adding one part by weight of said emulsion to from about 150 to about 200 parts by weight of water to form the coating composition.

3. Method for the preparation of polyethylene coating composition for application to glass surfaces for lubrication and protection against contact damage comprising the steps of:
   (a) melting a mixture of about 8 to about 12 parts by weight of a polyethylene having a molecular weight from about 1,200 to about 2,000 and about 15 to about 20 parts by weight of glycerine and maintaining the melt at about 100° C. to about 125° C.;
   (b) adding to the melt about 1.5 to about 3.0 parts by weight of potassium palmitate and from about 0.4 to about 2.0 parts of at least one emulsifier selected from the group consisting of an alkali metal salt of an alkyl benzene sulfonic acid and an alkali metal salt of a sulfonated succinic acid alkyl ester;
   (c) adding about 45 to about 50 parts of water preheated to a temperature between about 95° C. and about 100° C. with strong agitation to said melted mixture to form an emulsion containing from about 16% to about 20% by weight of polyethylene solids;
   (d) and adding about one part by weight of said emulsion to from about 150 to about 200 parts by weight of water to form the coating composition.

4. A glass container having a protective film thereon, said film being obtained by the evaporation of water from a coating composition that was applied to the glass surface, said composition comprising from about 150 to about 200 parts of water and about one part by weight of an aqueous emulsion, said emulsion comprising from about 8 to about 12 parts by weight of a polyethylene having a molecular weight from about 1,200 to about 2,000, from about 0.4 to about 2.0 parts by weight of at least one emulsifier selected from the group consisting of an alkali metal salt of an alkylbenzene sulfonic acid and an alkali metal salt of a sulfonated succinic acid alkyl ester, from about 1.5 to about 3.0 parts by weight of potassium palmitate, and from about 45 to about 50 parts by weight of water.

5. A glass container as claimed in claim 4 in which the aqueous emulsion further comprises from about 15 to about 20 parts by weight of glycerine.

References Cited

UNITED STATES PATENTS

| | | | |
|---|---|---|---|
| 2,290,794 | 7/1942 | Alvarado et al. | 260—29.6 |
| 2,313,144 | 3/1943 | Gomm | 260—29.6 |
| 2,739,058 | 3/1956 | O'Flynn et al. | |
| 2,838,418 | 6/1958 | Starkweather | 117—65 |
| 2,897,167 | 7/1959 | Dreisbach et al. | 260—23 |
| 2,995,533 | 8/1961 | Parmer et al. | 260—23 |
| 3,296,174 | 1/1967 | Pickard | 260—29.6 |
| 3,297,609 | 1/1967 | Hagemeyer et al. | 260—28.5 |
| 3,310,515 | 3/1967 | Halper et al. | 260—29.7 |
| 3,323,889 | 6/1967 | Carl et al. | 65—60 |
| 2,562,440 | 7/1951 | Staudinger et al. | 260—29.6 |
| 2,611,754 | 9/1952 | Rudoff | 260—29.6 |
| 2,741,650 | 4/1956 | Lukman et al. | 260—29.6 |

OTHER REFERENCES

Becher, "Emulsions: Theory and Practice," 1957, page 338.

DONALD E. CZAJA, Primary Examiner

R. A. WHITE, Assistant Examiner

U.S. Cl. X.R.

117—72, 94, 124; 260—29.6